US012695738B2

(12) United States Patent
Sethia et al.

(10) Patent No.: US 12,695,738 B2
(45) Date of Patent: Jul. 28, 2026

(54) SYSTEMS AND METHODS FOR DYNAMIC PROTECTION OF WIRELESS COMMUNICATION PROTOCOLS UTILIZING STEGANOGRAPHIC KEYS AND DUAL-LAYER CERTIFICATE AUTHENTICATION

(71) Applicant: BANK OF AMERICA CORPORATION, Charlotte, NC (US)

(72) Inventors: Maneesh Kumar Sethia, Hyderabad (IN); Jieh-Shan Lin, Harrisburg, NC (US); Gowri Sundar Suriyanarayanan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 120 days.

(21) Appl. No.: 18/658,046

(22) Filed: May 8, 2024

(65) Prior Publication Data

US 2025/0350590 A1    Nov. 13, 2025

(51) Int. Cl.
*H04L 29/00*        (2006.01)
*H04L 9/40*         (2022.01)

(52) U.S. Cl.
CPC .......... *H04L 63/0823* (2013.01); *H04L 63/10* (2013.01)

(58) Field of Classification Search
CPC ............................ H04L 63/0823; H04L 63/10
See application file for complete search history.

(56) References Cited

U.S. PATENT DOCUMENTS

| | | | |
|---|---|---|---|
| 6,636,689 B1 | 10/2003 | Stebbings |
| 7,152,047 B1 | 12/2006 | Nagel |
| 7,760,876 B2 | 7/2010 | Kocher |
| 7,929,409 B2 | 4/2011 | Chitrapu |
| 8,041,339 B2 | 10/2011 | Teunissen |
| 8,132,020 B2 | 3/2012 | Zhu |
| 8,181,262 B2 | 5/2012 | Cooper |
| 8,412,157 B2 | 4/2013 | Wang |
| 9,161,214 B2 | 10/2015 | Baras |

(Continued)

FOREIGN PATENT DOCUMENTS

| | | | |
|---|---|---|---|
| CN | 102760157 A | * 10/2012 | |
| CN | 115185789 A | * 10/2022 | .......... G06F 11/3065 |

*Primary Examiner* — Helai Salehi
(74) *Attorney, Agent, or Firm* — Moore & Van Allen PLLC; Nicholas C. Russell

(57) ABSTRACT

Systems, computer program products, and methods are described herein for dynamic protection of wireless communication protocols utilizing steganographic keys and dual-layer certificate authentication. The present disclosure is configured to identify the type of network to which a user device is connected, determine whether the network is approved, public, or captive, and provide a recommendation to enable wireless protection mode for untrusted networks. The system generates an on-demand protection key via a steganography server and signs it using a wireless protection certificate through a "Key in Key" (KIK) mechanism. The transaction application validates the certificate and encrypts sensitive transaction data using the on-demand key. Only packets that successfully validate the certificate are processed, while others are ignored. This dual-layer authentication prevents unauthorized packet-in-packet attacks and ensures data integrity and confidentiality across various wireless networks.

18 Claims, 6 Drawing Sheets

(56)     References Cited

U.S. PATENT DOCUMENTS

| | | | |
|---|---|---|---|
| 10,158,991 | B2 | 12/2018 | Link, II |
| 10,172,000 | B2 | 1/2019 | Link, II |
| 11,657,665 | B2 | 5/2023 | Manchovski |
| 2002/0013911 | A1 | 1/2002 | Cordella |
| 2002/0032867 | A1 | 3/2002 | Kellum |
| 2006/0020811 | A1 | 1/2006 | Tan |
| 2008/0098214 | A1* | 4/2008 | Rodriguez Martinez .................... H04L 9/3268 713/176 |
| 2009/0083544 | A1 | 3/2009 | Scholnick |
| 2011/0001603 | A1 | 1/2011 | Willis |
| 2011/0205016 | A1 | 8/2011 | Al-Azem |
| 2016/0239849 | A1 | 8/2016 | Othmer |
| 2020/0396088 | A1* | 12/2020 | Master ................ H04W 12/043 |
| 2021/0160235 | A1 | 5/2021 | Lerner |
| 2022/0232019 | A1* | 7/2022 | Sinks .................. H04L 63/1416 |

* cited by examiner

SYSTEMS AND METHODS FOR DYNAMIC PROTECTION OF WIRELESS COMMUNICATION PROTOCOLS UTILIZING STEGANOGRAPHIC KEYS AND DUAL-LAYER CERTIFICATE AUTHENTICATION

TECHNOLOGICAL FIELD

Example embodiments of the present disclosure relate to dynamic protection of wireless communication protocols utilizing steganographic keys and dual-layer certificate authentication.

BACKGROUND

In the evolving landscape of wireless communication, the security of transaction applications over wireless networks has become increasingly critical. Traditional security measures have struggled to keep pace with sophisticated cyber issues, particularly packet-in-packet attacks. These attacks use vulnerabilities in wireless transmission, allowing attackers to inject malicious packets within legitimate ones, leading to unauthorized access, data breaches, and service disruptions. Conventional methods for securing wireless communications have primarily focused on static encryption techniques and have not adequately addressed the dynamic nature of wireless connectivity and the unique challenges it presents, such as the case of intercepting transmissions on public and captive networks. Furthermore, the reliance on a single layer of encryption or certificate-based authentication has been proven ineffective in the face of advanced cyber threats, underscoring the need for a more robust and adaptive security solution.

Applicant has identified a number of deficiencies and problems associated with dynamic protection of wireless communication protocols utilizing steganographic keys and dual-layer certificate authentication. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for dynamic protection of wireless communication protocols utilizing steganographic keys and dual-layer certificate authentication.

The present disclosure introduces innovative systems, methods, and computer program products that revolutionize the dynamic protection of wireless communication protocols through the use of steganographic keys and dual-layer certificate authentication. This approach utilizes a unique method of embedding protection keys within communications in a manner that is both secure and invisible to unauthorized entities. The dual-layer certificate authentication, termed "Key in Key" technology, further enhances security by requiring two levels of verification for data access and transmission: one for the wireless network and another for the transaction application itself. By employing steganographic techniques for key distribution and requiring dual authentication for access, this solution effectively mitigates the problems associated with packet-in-packet attacks and other cyber threats. The system intelligently detects the security level of the network connection and adapts accordingly, providing a greater level of security for wireless transactions. This method ensures the integrity and confidentiality of data, even in the event of network vulnerabilities or external interference, thereby offering a comprehensive solution to the pressing challenges faced in securing wireless communications.

As such, embodiments of the invention relate to systems, methods, and computer program products for dynamic protection of wireless communication protocols utilizing steganographic keys and dual-layer certificate authentication, the invention including the general steps of: identify a network type to which a user device is connected, wherein the network type includes one of an approved network, a public network, or a captive network; generate an option within a transaction application interface to allow a user to add trusted networks, bypassing a wireless protection mode; provide a recommendation to enable the wireless protection mode for public or captive networks based on one or more identified potential security issues; transmit an option via the transaction application interface to approve enabling the wireless protection mode; generate a request to a steganography server to generate an on-demand protection key and wireless protection certificate; receive the on-demand protection key signed with the wireless protection certificate via the steganography server using a Key in Key (KIK) mechanism; validate the wireless protection certificate signature within the transaction application and extract the on-demand protection key from a packet; encrypt sensitive transaction data within the packet using the on-demand protection key; and approve only packets that successfully validate the wireless protection certificate and ignore packets that do not successfully validate the wireless protection certificate.

In some embodiments, the invention further includes generating an approved list of trusted networks and store the approved list in a secure database on the user device.

In some embodiments, the invention further includes the step of generating the on-demand protection key using a Rivest-Shamir-Adleman (RSA) or Elliptic Curve Cryptography (ECC) algorithm.

In some embodiments, the steganography server is configured to sign the on-demand protection key with a wireless protection certificate using an X.509 standard.

In some embodiments, the invention further includes the step of providing the recommendation for wireless protection mode based on predefined security criteria stored in a javascript object notation (JSON) configuration file.

In some embodiments, the transaction application interface is implemented using AlertDialog for Android or UIAlertController for iOS for pop-up notifications.

In some embodiments, the invention further includes the step of identifying the network type using a NEHotspotNetwork.fetchCurrent(completionHandler:) function in iOS or a ConnectivityManager class in Android.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompany- ing drawings. The components illustrated in the figures may or may not be present in certain embodiments described herein. Some embodiments may include fewer (or more) components than those shown in the figures.

Figure 1A:
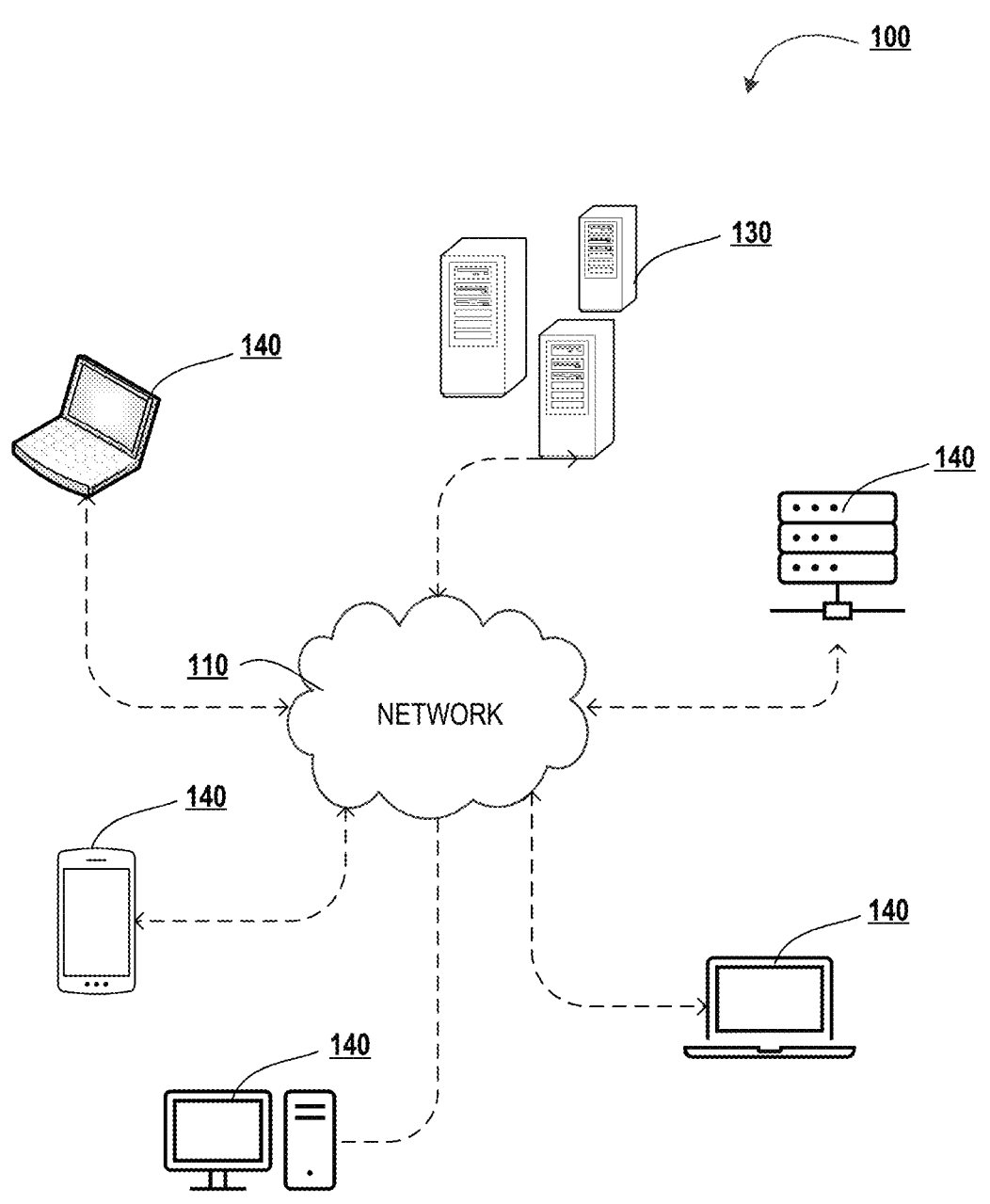
Figure 1B:
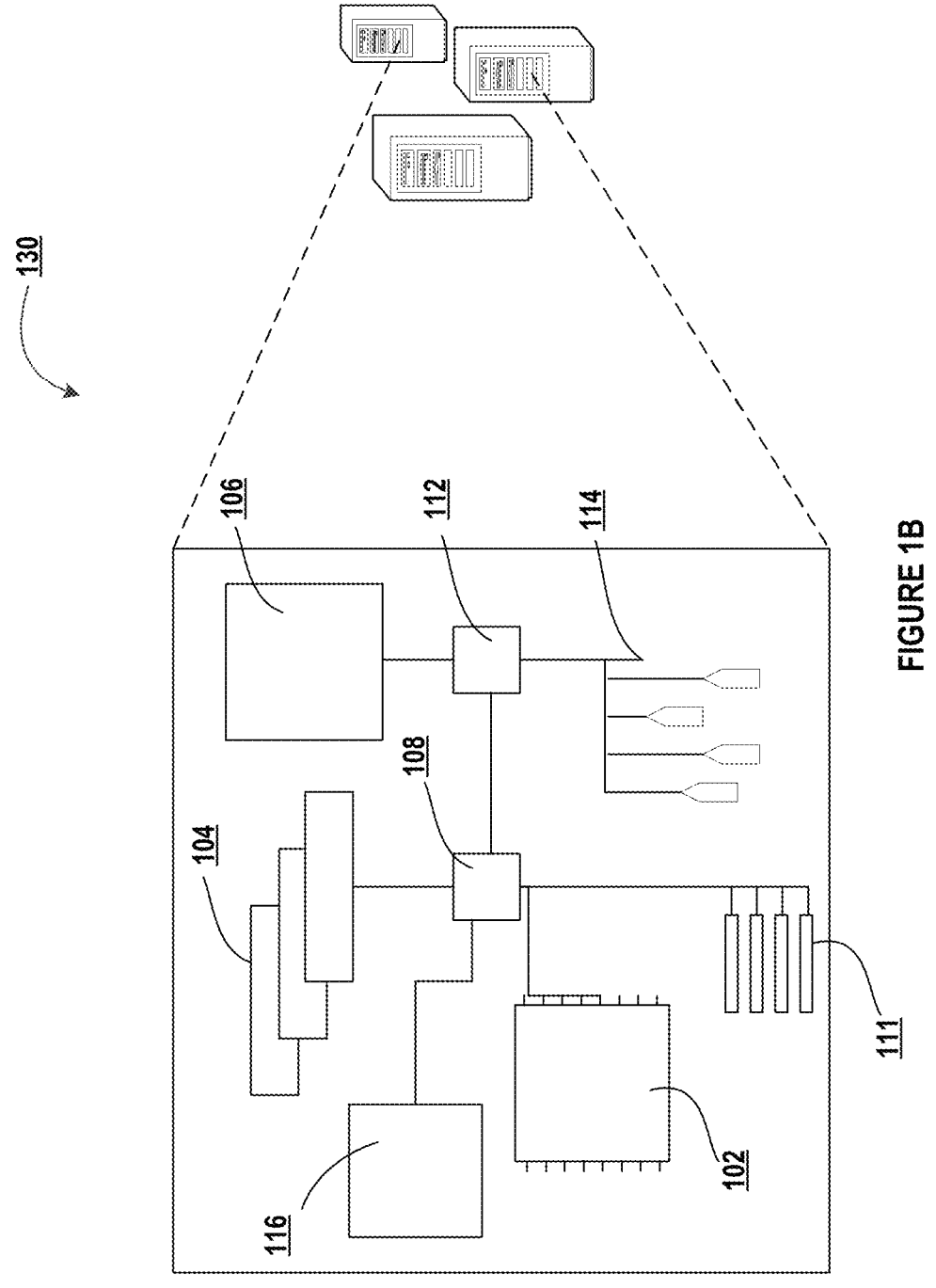
Figure 1C:
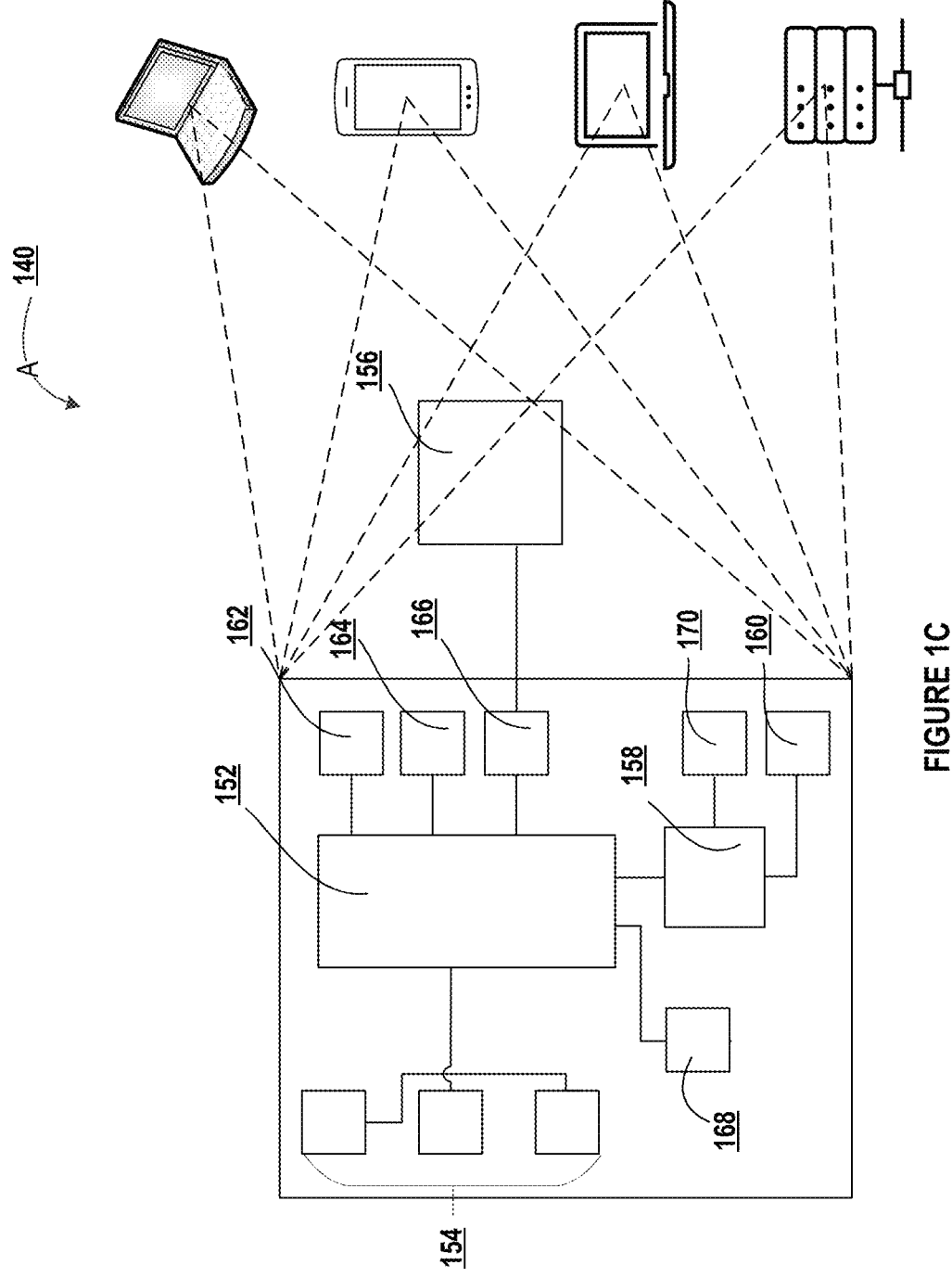
Figure 2:
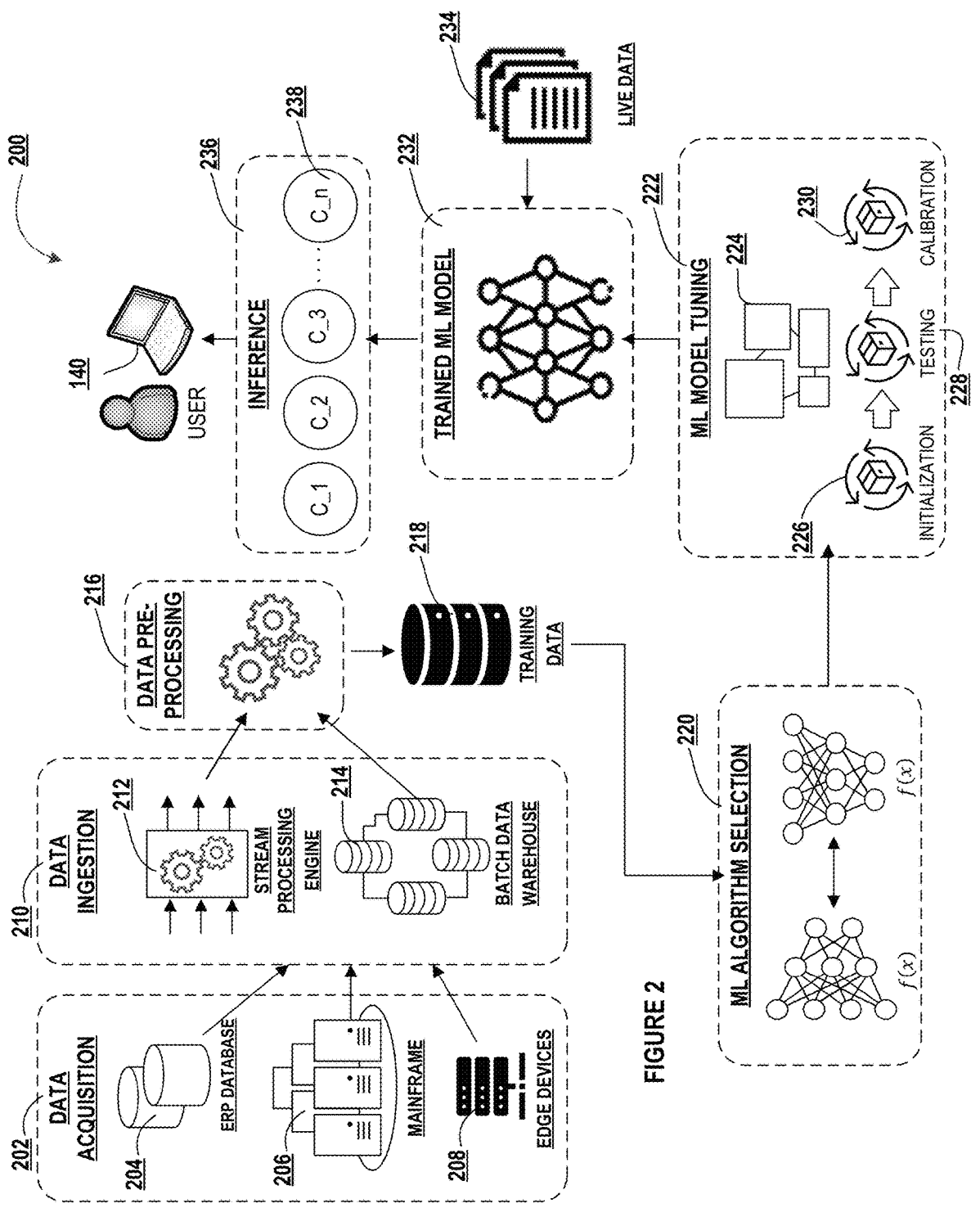
Figure 3:
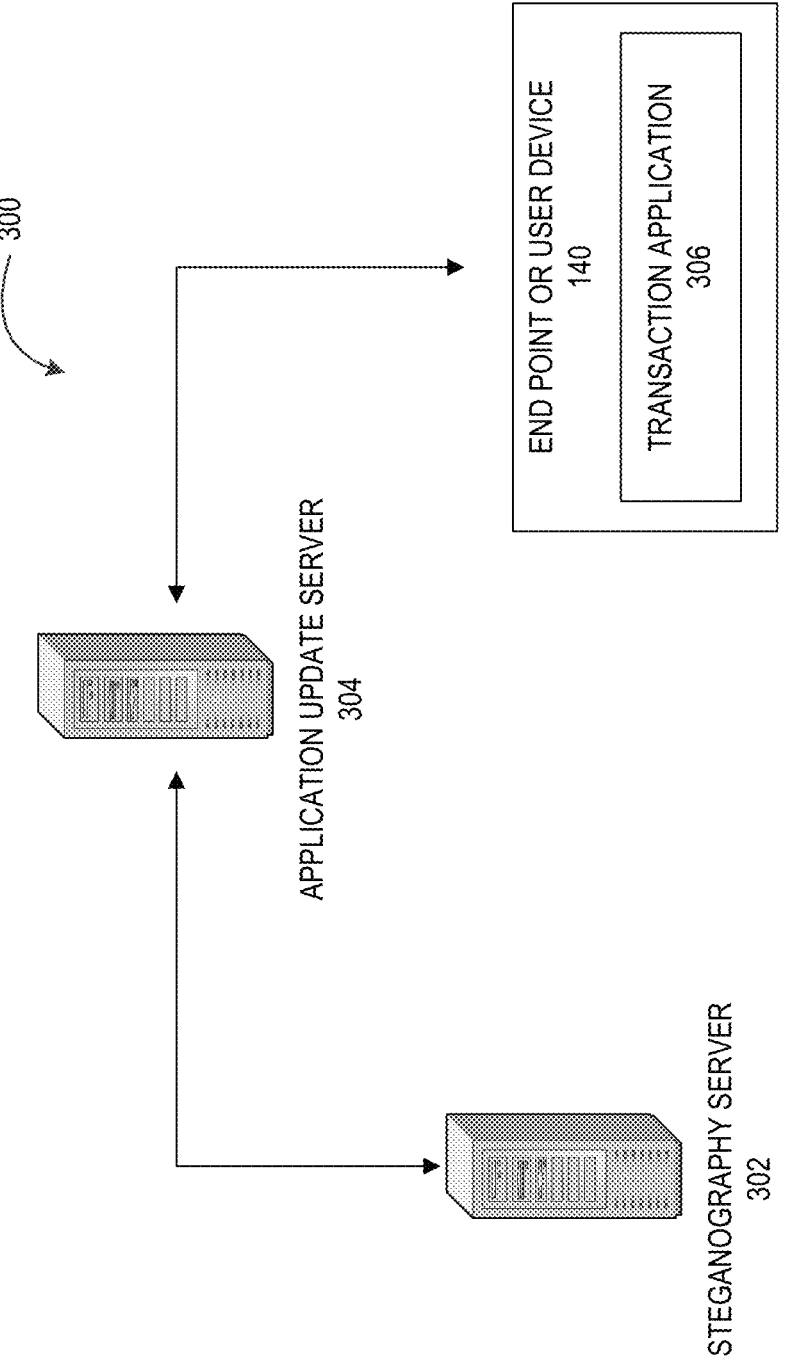
Figure 4:
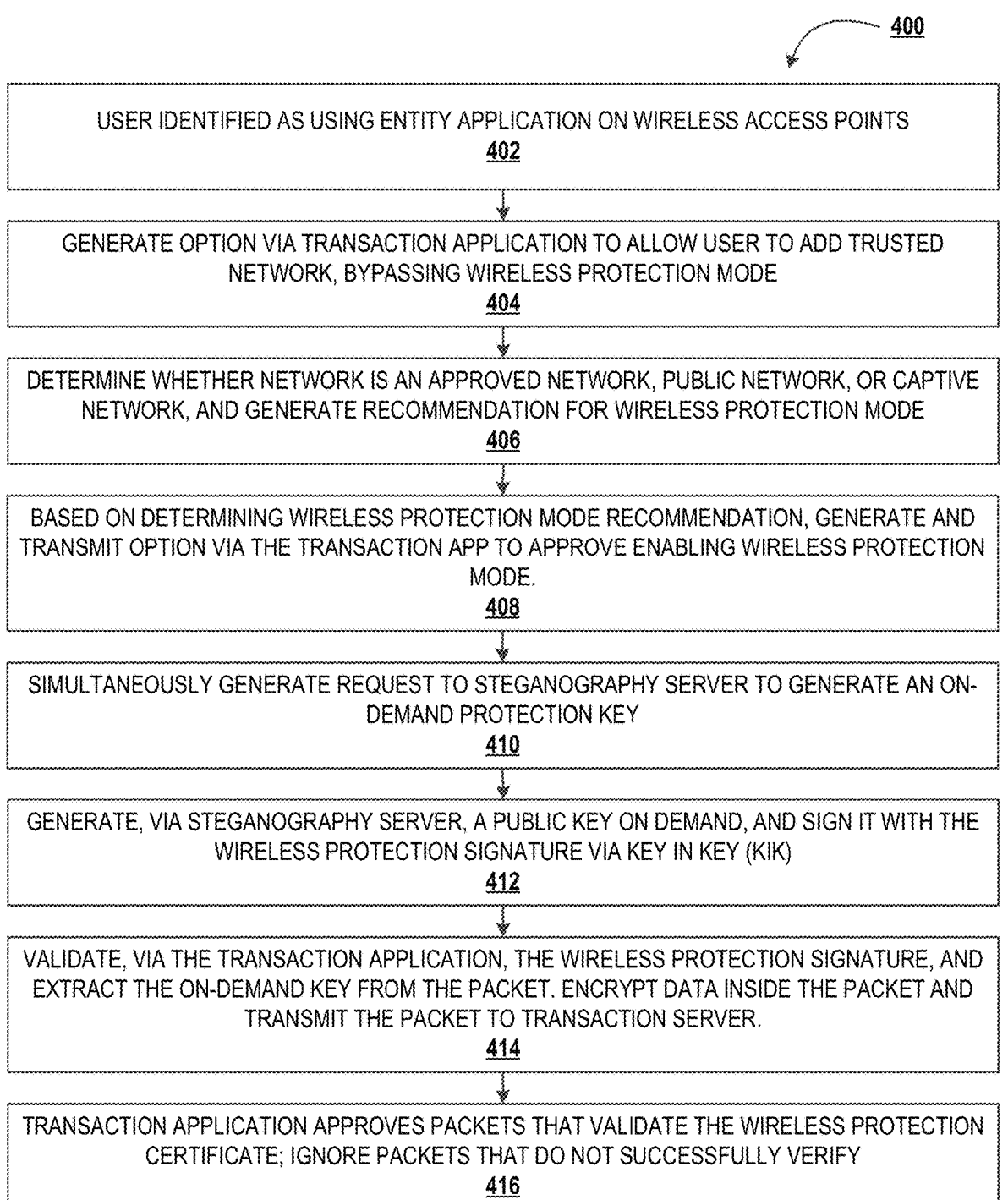

FIGS. 1A-1C illustrates technical components of an exemplary distributed computing environment for dynamic protection of wireless communication protocols utilizing steganographic keys and dual-layer certificate authentication, in accordance with an embodiment of the disclosure;

FIG. 2 illustrates an exemplary machine learning (ML) subsystem architecture 200, in accordance with an embodiment of the invention;

FIG. 3 illustrates further technical components via high level architecture diagram 300 for dynamic protection of wireless communication protocols utilizing steganographic keys and dual-layer certificate authentication, in accordance with an embodiment of the disclosure; and FIG. 4 illustrates a process flow for dynamic protection of wireless communication protocols utilizing steganographic keys and dual-layer certificate authentication, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The technology introduced herein utilizes the advanced principles of steganography, the art of hiding information within other non-secret text or data, and combines it with a sophisticated dual-layer certificate authentication method to enhance the security of wireless communication protocols. This inventive approach introduces a novel use of steganography for the dynamic protection of data transmitted over wireless networks, particularly focusing on the security of transaction applications. By embedding security keys within the data packets themselves in a way that is imperceptible to unauthorized interceptors, and requiring two independent levels of authentication to access and decrypt these packets, this technology sets a new standard in wireless communication security.

In the domain of wireless communication, the security of data transmission, especially for transaction-related applications, faces significant issues regarding cyber-attacks such as packet-in-packet attacks. These attacks use vulnerabilities in the transmission process to insert malicious data, leading to a range of security breaches, including unauthorized access, data loss, and the disruption of services. Traditional security measures, while providing a basic level of protection, fall short in effectively countering these sophisticated threats, especially in environments with variable connectivity and security levels, such as public and captive wireless networks. The present solution essentially hides (using steganography) security keys inside the data being sent over wireless networks, and then layers another level of security on top (dual-layer certification), making it extremely difficult for unauthorized parties to access the data. Even if someone manages to intercept the data, they cannot make sense of it without the unique keys.

Accordingly, the present disclosure introduces a cutting-edge technology that fundamentally enhances the security of wireless communications. By embedding steganographic keys within data transmissions and requiring dual-layer certificate authentication, this approach effectively shields against sophisticated cyber threats, ensuring that transactional data remains confidential and intact. This dual-protection mechanism not only significantly reduces the vulnerability of wireless transactions to attacks but also adapts to the security level of the network, offering a robust, flexible solution to safeguarding sensitive information in an increasingly connected world.

What is more, the present disclosure provides a technical solution to a technical problem. The technical problem includes the vulnerability of transaction applications on wireless networks to packet-in-packet attacks and other cyber threats that use data transmission errors and vulnerabilities. The technical solution presented herein allows for the secure transmission of confidential information over potentially insecure wireless networks by using steganography to hide protection keys within the data packets and dual-layer certificate authentication to ensure that only authorized devices and applications can access the data. In particular, this solution is an improvement over existing solutions to the problem of wireless data security by: (i) reducing the complexity of securing data transmissions, thus lowering the consumption of computing resources, (ii) providing a more reliable method for securing data against interception and unauthorized access, thus decreasing the need for corrective actions, (iii) automating the process of key generation and distribution, thereby enhancing the efficiency and speed of securing communications, and (iv) optimizing the security measures based on the network's security level, thus reducing unnecessary network traffic and resource use. Furthermore, the technical solution described herein employs a sophisticated, computerized process for embedding and authenticating security keys, a method not previously utilized in this context, bypassing traditional, more resource-intensive security measures.

FIGS. 1A-1C illustrate technical components of an exemplary distributed computing environment 100 for dynamic protection of wireless communication protocols utilizing steganographic keys and dual-layer certificate authentication, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) or user device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

In the context of packet-in-packet attacks, the data pre-processing engine 216 may generate training data based on labeled examples of network traffic containing both legitimate and malicious packets, or the like. Feature extraction techniques can identify specific characteristics of packet-in-packet attacks, such as unusual packet sizes, patterns of bit-flips, or nested encapsulation within packet headers. This labeled dataset serves as the training data 218 for detecting packet-in-packet attacks.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

It is understood that, in the case of packet-in-packet attacks, supervised learning algorithms may be particularly effective in detecting patterns indicative of such attacks. For instance, random forests, decision trees, and neural networks can be trained to classify network traffic based on labeled examples of legitimate and malicious packets. Unsupervised learning techniques, like clustering or anomaly detection, can also help identify unusual packet structures that deviate from normal network traffic patterns, potentially flagging suspicious packet-in-packet attacks.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyper-parameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates further technical components via high level architecture diagram 300 for dynamic protection of wireless communication protocols utilizing steganographic keys and dual-layer certificate authentication, in accordance with an embodiment of the disclosure. As shown, FIG. 3 includes a steganography server 302, an application update server 304, and an end point or user device 140 hosting a transaction application 306. It is understood that this system architecture is designed to dynamically protect transaction applications from packet-in-packet attacks by employing steganographic keys and dual-layer certificate authentication, also known as the "Key in Key" (KIK) technique.

The steganography server 302 is responsible for generating on-demand protection keys and wireless protection certificates. It implements a "Key in Key" mechanism, where the protection keys are signed with wireless protection certificates before being sent to the application update server 304. These keys and certificates are crucial for securing transaction data against packet-in-packet attacks. The steganography server 302 allows for various validity periods for the generated keys, such as one-time use, per-session, or per-timeline, depending on the security requirements of the transaction.

The application update server 304 acts as a bridge between the steganography server 302 and the transaction application 306. It is understood that the application update server 304 retrieves the wireless protection certificates and the on-demand protection keys from the steganography server 302 and packages them into transaction app update packages. These packages are then pushed to the End Point or user device 140 via a "Package Updater Module." This regular update process ensures that the transaction application 306 always has the latest protection certificates, enabling it to identify and validate malicious packet attempts.

As noted with regard to FIG. 1, the end point or user device 140 is any electronic device that hosts the transaction application 306. Examples include personal digital assistants, smartphones, laptops, desktops, point-of-sale (POS) devices, and electronic payment kiosks. The transaction application 306 incorporates a native library that can detect the type of wireless network, distinguishing between public, captive, and approved networks. For public or captive networks, it requests the steganography server 302 to generate an on-demand protection key.

When a public or captive network is detected, the transaction application 306 requests a protection key from the steganography server 302 via the application update server 304. Once received, the transaction application 306 uses the key to encrypt data within the packet and sends it to the transaction server. The application validates packets containing the wireless protection signature and rejects any packet that does not successfully verify. As such, by employing the "Key in Key" (KIK) technique, this system ensures secure packet transmission even in the presence of packet-in-packet attacks, thereby protecting sensitive transaction data from unauthorized access or modification.

FIG. 4 illustrates a process flow for dynamic protection of wireless communication protocols utilizing steganographic keys and dual-layer certificate authentication, in accordance with an embodiment of the disclosure. As shown in block 402, the user initiates a session with the entity's transaction application 306 on a wireless access point. This transaction application 306 can operate on various user devices, such as smartphones, laptops, and point-of-sale (POS) systems. As an example, in iOS, the application uses a NEHotspotNetwork.fetchCurrent(completionHandler:) function to return the security type, indicating whether the network is public, captive, or protected. In Android, the ConnectivityManager class via getSystemService (Context. CONNECTIVITY_SERVICE) helps determine the network type. The application identifies the type of network the device is connected to, whether public, captive, or approved. By identifying the network type, the application can prompt the user to enable appropriate security measures. One of ordinary skill in the art will appreciate that the identification process is crucial for providing secure wireless protection.

As further indicated block 404, the transaction application 306 provides an option for the user to add trusted networks to the approved list. If the network is trusted, the application bypasses the wireless protection mode to allow direct transaction processing. The application stores trusted networks in a secure SQLite database on the device, managed using SQL queries or ORMs like Room in Android and Core Data in iOS. This feature enables users to customize their network security preferences efficiently. The trusted network list ensures faster transactions while maintaining secure connections. It is understood that this flexibility reduces unnecessary prompts for protection mode on trusted networks.

As indicated in block 406, the transaction application 306 determines whether the network is an approved, public, or captive network. For public or captive networks, the application generates a recommendation to enable wireless protection mode. This recommendation is based on network type and potential security issues associated with untrusted networks. Network type determination and classification are managed via custom classes in Java/Kotlin for Android and Swift/Objective-C for iOS, incorporating logic to assess potential issues using predefined criteria stored in local JSON configuration files. The application ensures that all transaction data remains encrypted and protected on public networks. By generating security recommendations, it prevents unauthorized packet interception and packet-in-packet attacks.

Following determining the wireless protection mode recommendation, the application transmits an option to the user to approve the enabling of wireless protection mode, as indicated in block 408. This option appears as a pop-up on the transaction application 306 interface, prompting the user to confirm or reject the recommendation. If confirmed, the application immediately switches to secure mode and generates a request for a protection key. Pop-up notifications are implemented using AlertDialog in Android and UIAlertController in iOS. The request for the protection key is sent via a REST API implemented using Retrofit (Android) or Alamofire (iOS) to communicate with the steganography server 302. The protection mode helps ensure sensitive transaction data remains secure. By providing users with transparent control, it ensures maximum protection based on individual security preferences.

As shown in block 410, upon approval from the user, the transaction application 306 sends a simultaneous request to the steganography server 302 for an on-demand protection key. This key is generated uniquely for each session, providing secure encryption tailored to specific network conditions. The request also triggers the generation of wireless protection certificates. The steganography server 302, implemented in Python using the Flask framework, generates the key using Rivest-Shamir-Adleman (RSA) or Elliptic Curve Cryptography (ECC) algorithms from the cryptography library. The steganography server 302 promptly signs the key with the wireless protection signature. This dynamic request process ensures each protection key is valid and secure for its intended session.

As further indicated in block 412, the steganography server 302 generates a public key on demand and signs it with the wireless protection signature using the "Key in Key" (KIK) mechanism. This ensures that only authorized applications with the appropriate wireless protection certificate can decrypt the key. The KIK mechanism is implemented using Python libraries like cryptography and pyOpenSSL. The steganography server 302 embeds the public key within a digital certificate using the X.509 standard and signs it with its private key, adding an additional layer of security. The KIK mechanism provides an additional layer of security by embedding the public key within the protection certificate. This dual-layer authentication prevents unauthorized access to sensitive transaction data. Once signed, the public key is returned to the transaction application 306 via an application update server.

Shown in block 414, the transaction application 306 validates the wireless protection signature and extracts the on-demand key from the packet. It uses this key to encrypt sensitive transaction data within the packet. The application uses the RSA or ECC algorithms provided by Java's javax.crypto library (Android) or Swift's CryptoKit (iOS) to perform encryption. The encrypted packet is then transmitted securely to the transaction server. The dual-layer authentication ensures that only packets signed with the wireless protection certificate are processed. This encryption process safeguards transaction data against packet-in-packet attacks and unauthorized access.

The transaction application 306 only approves packets that successfully validate the wireless protection certificate. Any packet that fails to verify the certificate is ignored, preventing unauthorized data processing. This stringent validation process effectively blocks packet-in-packet attacks. By using the "Key in Key" (KIK) mechanism, only authorized packets are processed for secure transactions. Packet validation is achieved in some embodiments through Java's javax.crypto library (Android) or Swift's CryptoKit (iOS), ensuring that the wireless protection signature is intact and matches the transaction application's expected signature. This layer of security ensures data integrity and confidentiality throughout the transaction process.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for dynamic protection of wireless communication protocols utilizing steganographic keys and dual-layer certificate authentication, the system comprising:
   a processing device;
   a non-transitory storage device containing instructions when executed by the processing device, causes the processing device to perform the steps of:
      identify a network type to which a user device is connected, wherein the network type includes one of an approved network, a public network, or a captive network;
      generate an option within a transaction application interface to allow a user to add trusted networks, bypassing a wireless protection mode, wherein the trusted networks are stored in a secure SQLite database reducing prompts for protection mode;
      provide a recommendation to enable the wireless protection mode for public or captive networks based on one or more identified potential security issues;
      transmit an option via the transaction application interface to approve enabling the wireless protection mode, wherein the transmission of the option via the transaction application interface is implemented using: AlertDialog for Android or UIAlertController for iOS for pop-up notifications;
      generate a request to a steganography server to generate an on-demand protection key and a wireless protection certificate;
      receive the on-demand protection key signed with the wireless protection certificate via the steganography server using a Key in Key (KIK) mechanism;
      validate the wireless protection certificate within the transaction application and extract the on-demand protection key from a packet;
      encrypt sensitive transaction data within the packet using the on-demand protection key; and
      approve only packets that successfully validate the wireless protection certificate and ignore packets that do not successfully validate the wireless protection certificate.

2. The system of claim 1, wherein the system is further configured to: generate an approved list of trusted networks and store the approved list in a secure database on the user device.

3. The system of claim 1, wherein the steganography server is configured to: generate the on-demand protection key using a Rivest-Shamir-Adleman (RSA) or Elliptic Curve Cryptography (ECC) algorithm.

4. The system of claim 1, wherein the steganography server is configured to: sign the on-demand protection key with a wireless protection certificate using an X.509 standard.

5. The system of claim 1, wherein the system is further configured to provide the recommendation for wireless protection mode based on predefined security criteria stored in a javascript object notation (JSON) configuration file.

6. The system of claim 1, wherein the system is further configured to identify the network type using a NEHotspotNetwork.fetchCurrent (completionHandler:) function in iOS or a ConnectivityManager class in Android.

7. A computer program product for dynamic protection of wireless communication protocols utilizing steganographic keys and dual-layer certificate authentication, the computer program product comprising a non-transitory computer-readable medium comprising code causing an apparatus to:

identify a network type to which a user device is connected, wherein the network type includes one of an approved network, a public network, or a captive network;

generate an option within a transaction application interface to allow a user to add trusted networks, bypassing a wireless protection mode, wherein the trusted networks are stored in a secure SQLite database reducing prompts for protection mode;

provide a recommendation to enable the wireless protection mode for public or captive networks based on one or more identified potential security issues;

transmit an option via the transaction application interface to approve enabling the wireless protection mode, wherein the transmission of the option via the transaction application interface is implemented using: Alert-Dialog for Android or UIAlertController for iOS for pop-up notifications;

generate a request to a steganography server to generate an on-demand protection key and a wireless protection certificate;

receive the on-demand protection key signed with the wireless protection certificate via the steganography server using a Key in Key (KIK) mechanism;

validate the wireless protection certificate within the transaction application and extract the on-demand protection key from a packet;

encrypt sensitive transaction data within the packet using the on-demand protection key; and approve only packets that successfully validate the wireless protection certificate and ignore packets that do not successfully validate the wireless protection certificate.

8. The computer program product of claim 7, wherein the code further causes the apparatus to: generate an approved list of trusted networks and store the approved list in a secure database on the user device.

9. The computer program product of claim 7, wherein the steganography server is configured to generate the on-demand protection key using a Rivest-Shamir-Adleman (RSA) or Elliptic Curve Cryptography (ECC) algorithm.

10. The computer program product of claim 7, wherein the steganography server is configured to: sign the on-demand protection key with a wireless protection certificate using an X.509 standard.

11. The computer program product of claim 7, wherein the code further causes the apparatus to provide the recommendation for wireless protection mode based on predefined security criteria stored in a javascript object notation (JSON) configuration file.

12. The computer program product of claim 7, wherein the code further causes the apparatus to: identify the network type using a NEHotspotNetwork.fetchCurrent(completionHandler:) function in iOS or a ConnectivityManager class in Android.

13. A method for dynamic protection of wireless communication protocols utilizing steganographic keys and dual-layer certificate authentication, the method comprising:

identify a network type to which a user device is connected, wherein the network type includes one of an approved network, a public network, or a captive network;

generate an option within a transaction application interface to allow a user to add trusted networks, bypassing a wireless protection mode, wherein the trusted networks are stored in a secure SQLite database reducing prompts for protection mode;

provide a recommendation to enable the wireless protection mode for public or captive networks based on one or more identified potential security issues;

transmit an option via the transaction application interface to approve enabling the wireless protection mode, wherein the transmission of the option via the transaction application interface is implemented using: Alert-Dialog for Android or UIAlertController for iOS for pop-up notifications;

generate a request to a steganography server to generate an on-demand protection key and a wireless protection certificate;

receive the on-demand protection key signed with the wireless protection certificate via the steganography server using a Key in Key (KIK) mechanism;

validate the wireless protection certificate within the transaction application and extract the on-demand protection key from a packet;

encrypt sensitive transaction data within the packet using the on-demand protection key; and approve only packets that successfully validate the wireless protection certificate and ignore packets that do not successfully validate the wireless protection certificate.

14. The method of claim 13, wherein the system is further configured to: generate an approved list of trusted networks and store the approved list in a secure database on the user device.

15. The method of claim 13, wherein the steganography server is configured to: generate the on-demand protection key using a Rivest-Shamir-Adleman (RSA) or Elliptic Curve Cryptography (ECC) algorithm.

16. The method of claim 13, wherein the steganography server is configured to: sign the on-demand protection key with a wireless protection certificate using an X.509 standard.

17. The method of claim 13, wherein the method further comprises: provide the recommendation for wireless protection mode based on predefined security criteria stored in a javascript object notation (JSON) configuration file.

18. The method of claim 13, wherein the method further comprises: identify the network type using a NEHotspotNetwork.fetchCurrent (completionHandler:) function in iOS or a ConnectivityManager class in Android.

* * * * *